United States Patent [19]
Keeley

[11] Patent Number: 5,471,638
[45] Date of Patent: Nov. 28, 1995

[54] BUS INTERFACE STATE MACHINES WITH INDEPENDENT ACCESS TO MEMORY, PROCESSOR AND REGISTERS FOR CONCURRENT PROCESSING OF DIFFERENT TYPES OF REQUESTS

[75] Inventor: James W. Keeley, Nashua, N.H.

[73] Assignee: Bull HN Inforamtion Systems Inc., Billerica, Mass.

[21] Appl. No.: 263,987

[22] Filed: Jun. 22, 1994

Related U.S. Application Data

[63] Continuation of Ser. No. 771,712, Oct. 4, 1991, abandoned.

[51] Int. Cl.$^6$ .................................................. G06F 3/00
[52] U.S. Cl. ..................... 395/800; 395/293; 395/427; 395/825
[58] Field of Search ........................... 395/325, 425, 395/275, 800; 364/72.5, 200, 260, 240.1

[56] References Cited

U.S. PATENT DOCUMENTS

| | | | |
|---|---|---|---|
| 4,099,236 | 7/1978 | Goodman et al. | 395/325 |
| 4,247,893 | 1/1981 | Anderson et al. | 395/425 |
| 4,415,971 | 11/1983 | Guillemet et al. | 395/325 |
| 4,433,378 | 2/1984 | Leger | 395/325 |
| 4,698,753 | 10/1987 | Hubbins et al. | 395/325 |
| 4,797,853 | 1/1989 | Savage et al. | 395/425 |
| 4,831,520 | 5/1989 | Rubinfeld et al. | 395/325 |
| 4,992,930 | 2/1991 | Gilfeather et al. | 364/200 |
| 5,003,465 | 3/1991 | Chisholm et al. | 395/275 |
| 5,077,664 | 12/1991 | Taniai et al. | 395/425 |
| 5,111,425 | 5/1992 | Takeuchi et al. | 395/425 |
| 5,123,092 | 6/1992 | Buxton et al. | 395/250 |
| 5,235,685 | 8/1993 | Caldara et al. | 395/325 |

Primary Examiner—Alyssa H. Bowler
Assistant Examiner—Dan Fiul
Attorney, Agent, or Firm—Faith F. Driscoll; John S. Solakian

[57] ABSTRACT

A processor couples to a system bus and includes a high performance microprocessor which tightly couples to a local memory. The processor is organized at the interface level into a plurality of interface sections which include a corresponding number of state machines for enabling the simultaneous processing of a plurality of different types of transactions or requests under all conditions. One interface section is organized to include the system visible registers which are accessible for reading and writing by I/O commands received from the system bus. Another section processes memory commands received from the system bus while a further section processes read/write and I/O commands issued to the system bus by the processor.

13 Claims, 10 Drawing Sheets

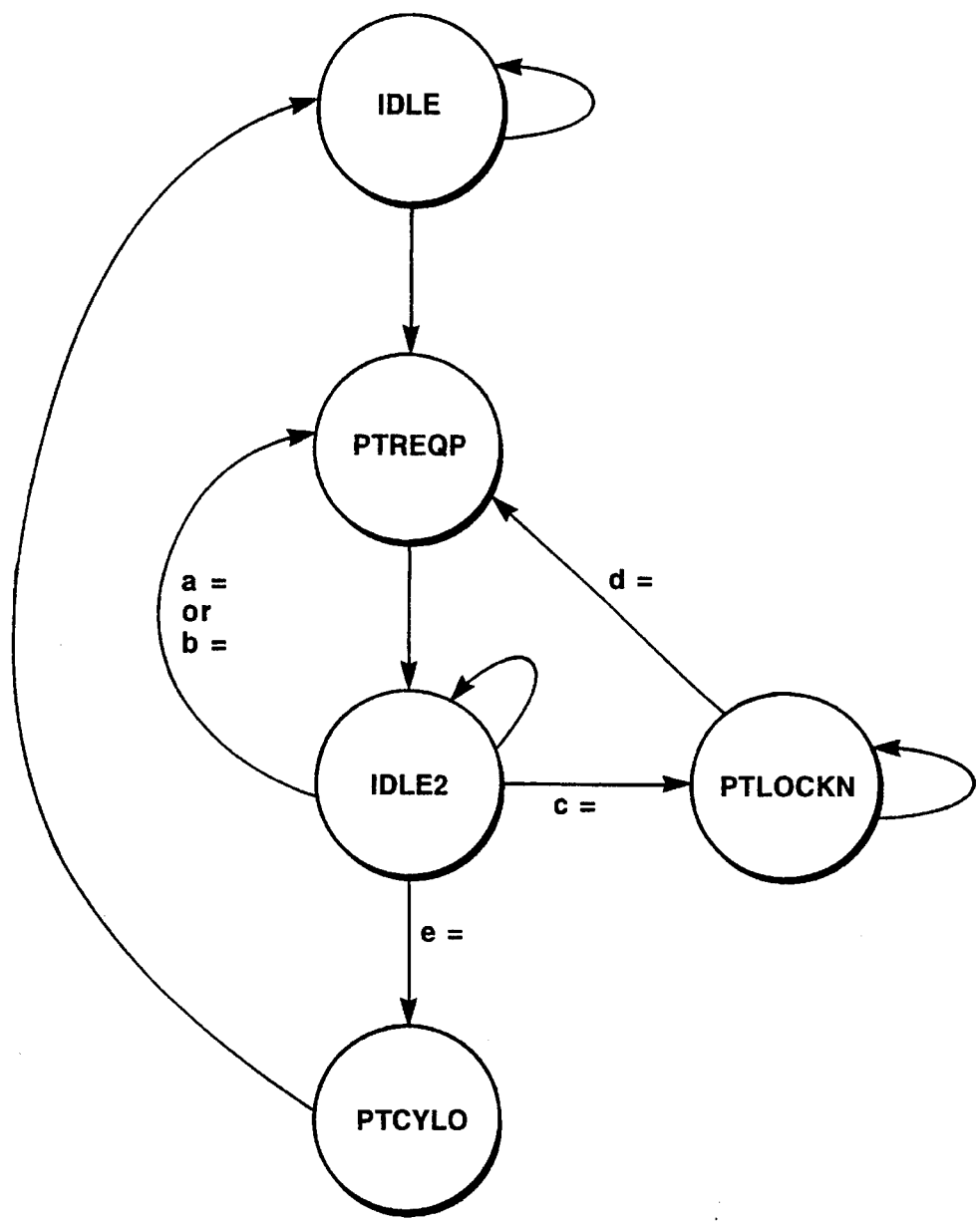

a = RXHAVE & RXPTWON & RXWAIT;
b = RXHAVE & RXPTWON & PTNKFLPS & (RXTMOT # $\overline{\text{RXTMOT}}$ & RXNAKR & RXMREF & RXLOCK # RXTMOT & RXNAKR & RXMREF & RXLOCK & RXSHBC);
c = RXHAVE & RXPTWON & RXNAKR & RXMREF & RXLOCK & RXSHBC;
d = RXHAVE & PTLOCKN & RXACKR & RXMREF & RXLOCK & RXSHBC;
e = RXHAVE & RXPTWON & (RXANYR & RXACKR # $\overline{\text{RXTMOT}}$ & RXNAKR & $\overline{\text{RXMREF}}$ # PTNKFLP & (RXTMOT # RXNAKR & RXMREF & RXLOCK # RXNAKR & RXMREF & $\overline{\text{RXLOCK}}$ & RXSHBC));

*Fig. 4a* a = RXHAVE & RTNKFLS & RXRTWON & (RXNAKR # RXWAIT);
b = RXHAVED RXRTWON & (RXACKR # RTNKFLP &(RTNAKR # RXWAIT));

a = RXHAVE & RXXTWON & RXANYR & $\overline{\text{XTNKFLP}}$ & (RXNAKR # RXWAIT);
b = RXHAVE & RXXTWON & RXANYR & RXACKR & XBBURST & (BURSTA1 & BURTSA2);
c = RXHAVE & RXXTWON & XTNKFLP & (RXNAKR # RXWAIT) # RXHAVE RXXTWON & RXACKER & RXANYR & $\overline{\text{XBBURST}}$ # RXHAVE & RXXTWON & RXACKER & RXANYR & XBBURST & BURSTA1 & BURSTA2;

BUS INTERFACE STATE MACHINES WITH INDEPENDENT ACCESS TO MEMORY, PROCESSOR AND REGISTERS FOR CONCURRENT PROCESSING OF DIFFERENT TYPES OF REQUESTS

This is a continuation of application Ser. No. 07/771,712, filed on Oct. 4, 1991, now abandoned.

RELATED APPLICATIONS

1. The patent application of James W. Keeley and Thomas F. Joyce entitled, "High Performance Tightly Coupled Multiple Synchronous State Machine Based Processing Unit," filed on Oct. 4, 1991, bearing Ser. No. 07/771,289, which is assigned to the same assignee as this patent application now U.S. Pat. No. 5,341,508.

2. The patent application of Thomas F. Joyce and James W. Keeley entitled, "Method and Apparatus for Avoiding Processor Deadly Embrace in a Multiprocessor System," filed on Oct. 4, 1991, bearing Ser. No. 07/771,296, which is assigned to the same assignee as this patent application now U.S. Pat. No. 5,283,870.

3. The patent application of Thomas F. Joyce and James W. Keeley entitled, "Programmable Bus State Machine," filed on Oct. 4, 1991, bearing Ser. No. 07/771,297, which is assigned to the same assignee as this patent application now U.S. Pat. No. 5,341,495.

BACKGROUND OF THE INVENTION

1. Field of Use

The present invention relates to data processing systems and, more particularly, to systems for processing different types of requests.

2. Prior Art

One system includes a plurality of units which are tightly coupled to an asynchronous system bus network. Different types of requests, including processor and input/output commands are issued by peer and maintenance processors. This type of system is generally described in greater detail in U.S. Pat. No. 4,992,930.

While the peer processor in the above system can process different types of system bus requests, they cannot be processed simultaneously and require that the processor operation be stalled in order to process properly certain types of requests, such as I/O requests.

Accordingly, it is a primary object of the present invention to provide a system which has improved performance.

It is a more specific object of the present invention to provide a system which is capable of handling requests from a plurality of requestors having different types of requirements.

SUMMARY OF THE INVENTION

The above objects are achieved in a high performance processor which has a tightly coupled (on-board) local memory and includes a plurality of areas or interface sections for processing different types of transactions or requests. In the preferred embodiment, these interface sections include a first interface section for processing processor generated read/write requests to the system bus, a second interface section for processing externally received read commands to be directed to the processor's local on-board memory and a third interface section for processing externally received I/O register commands. Means are included for coupling all of externally addressable registers in common to one of the interface sections, enabling the simultaneous processing of the different types of requests.

In the preferred embodiment, each type of transaction or request is queued up and the transaction or request is completed by the appropriate one of the interface sections under the control of an independently operated state machine. Each state machine is uniquely programmed to complete the transaction under all possible circumstances, including the handling of retry or bus wait or other response situations. This enables several system bus transaction sequences to take place simultaneously requiring different retry procedures.

The above and other objects and advantages of the present invention will be better understood from the following detailed description taken in conjunction with the accompanying drawings.

BRIEF DESCRIPTION OF THE DRAWINGS

FIGS. 4a through 4c are state diagrams used in explaining the operation of the state machines of FIG. 2.

DETAILED DESCRIPTION OF THE PREFERRED EMBODIMENT

Figure 1:
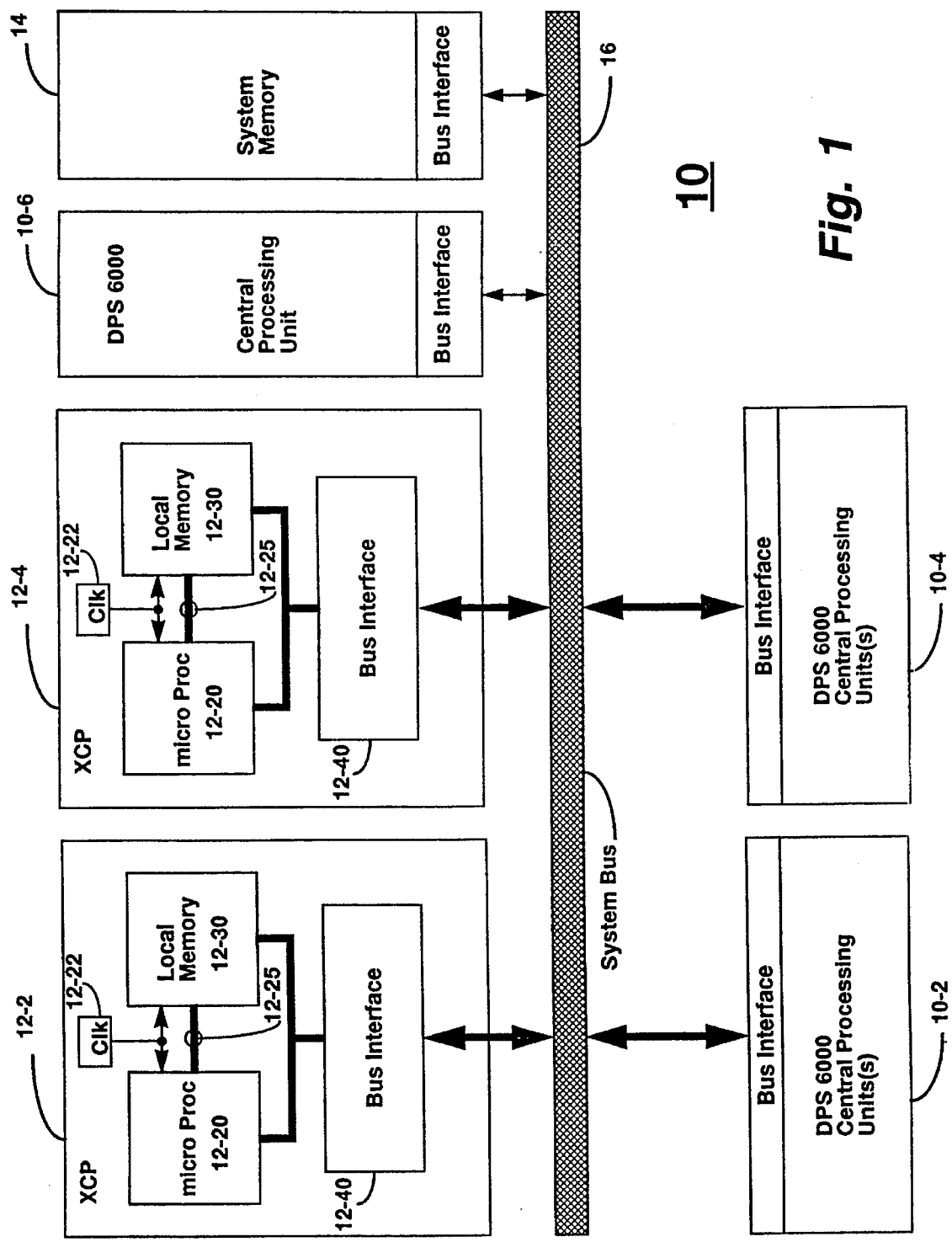
FIG. 1 is a block diagram of a multiprocessor system which incorporates the interface system of the present invention.

Description of FIG. 1

FIG. 1 shows a multiprocessor system 10 which includes a plurality of central processing units 10-2 through 10-6 and peer processors 12-2 and 12-4 which tightly couple in common to a system bus 16 and to a main memory or system memory 14. Each processor, as shown, includes a bus interface area which enables the unit to transmit or receive requests in the form of commands, interrupts, data or responses/status to another unit on system bus 16. In the preferred embodiment, the system bus 16 operates asynchronously and uses a split bus cycle protocol which provides higher performance by granting other units bus cycles during the period of time a unit is waiting for main memory to furnish data in response to an earlier request made by that unit. For further information regarding this type of bus interface and operation, reference may be made to U.S. Pat. No. 3,997,896.

Referring to FIG. 1, it is seen that each peer processor 12-2 and 12-4 includes a microprocessor 12-20, a local memory 12-30 and interface buses which couple to the bus interface circuits of block 12-40 as shown. The microprocessor 12-20 and local memory 12-30 are tightly coupled through a local processor bus 12-25. The clock generator circuits 12-22 generate a single frequency clock signal CLKREF of 33 MHz which provides the fundamental timing and internal operating frequency for microprocessor 12-20, in addition to all of the other circuits which make up processor 12-2. The microprocessor 12-20 is a high performance 32-bit processor which operates at clock speeds of up to 33 MHz and in the preferred embodiment corresponds to an Intel 80486 chip. The Intel 80486 chip includes a microprocessor, a floating point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12-2 and 12-4 operate under the control of a UNIX® (UNIX is a registered trademark of X/Open Company Limited) operating system.

In FIG. 1, the processors 10-2 through 10-6 function as host processors. In the preferred embodiment, each processor takes the form of a Bull DPS6000 system which operates under the control of the Bull HVS proprietary operating system. In the system of FIG. 1, each of the processors are organized to operate in an independent manner and have access to the full complement of system resources, such as input/output units, main memory and the like.

Figure 2:
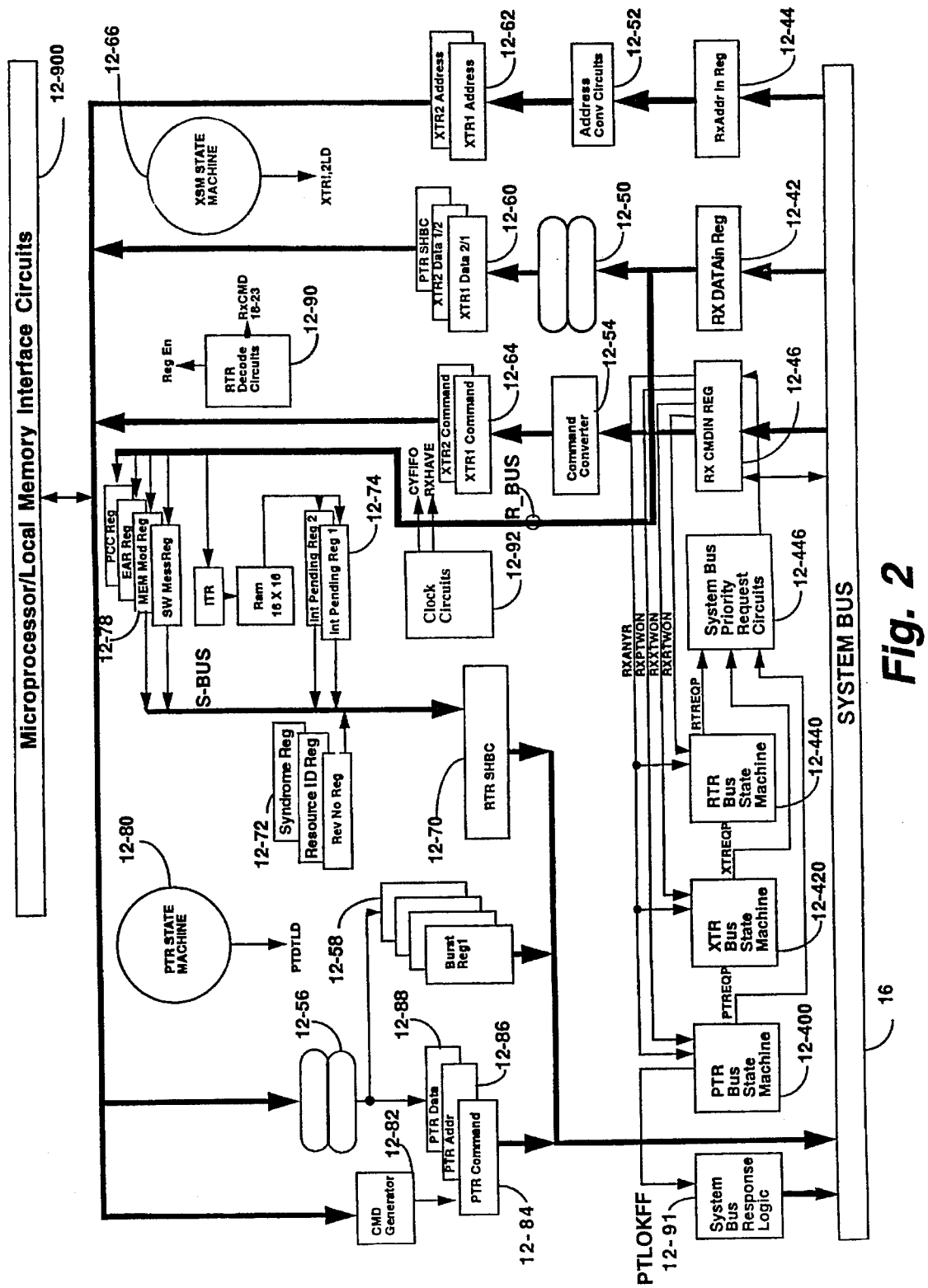
FIG. 2 shows in greater detail, a processing unit of FIG. 1 which incorporates the interface system of the present invention.

Description of FIG. 2

FIG. 2 shows in greater detail, a portion of the on-board processor 12-2 of FIG. 1. In the preferred embodiment, the microprocessor 12-20 and local memory 12-30, along with associated control circuits, in addition to clock generation circuits of block 12-22, are contained on a single daughter board which couples to the interface circuits of block 12-900. The bus interface circuits, sets of command, address and data registers and state control circuits are contained on the mother board. These two boards make up the entire processor.

Each external request received from system bus 16 to access local memory 12-30 which has been acknowledged by the system bus response logic circuits, not shown, is loaded into the corresponding receive data, address and command registers 12-42 through 12-46 in response to an enable signal CYCREQ generated by clock logic circuits of block 12-92. The address and command signals are converted into the appropriate form by address and command converter circuits of blocks 12-52 and 12-54 and stored in available registers of the two sets of queue registers of blocks 12-62 and 12-64, in response to signal CYFIFO. Thereafter, the stored address and command signals are applied to the processor bus via the interface circuits of block 12-900, in response to an enabling signal EADQTP. Additionally, the bus command signals are applied to the system bus response logic circuits of block 12-91.

Any data associated with a request loaded into register 12-42 is reordered as required by the programmable array logic (PALs) of block 12-50 and stored into the appropriate one of the register of block 12-60. The different bytes of the data words are swapped from the so-called big endian format of the system bus to the little endian format utilized by microprocessor 12-20. This is accomplished by the byte swap circuits included in block 12-900 which is implemented by the proper reordering of connector pin connections.

The XSM state machine 12-66 generates the required control signals for executing external memory read and write requests. In response to an input signal RXHAVE received from the circuits of block 12-90, which indicates the receipt of a memory request, the XSM state machine 12-66 loads the request into one of the sets of registers of the two level queue. It also enables transfer of the memory request via signal EADQTP to local memory 12-30 via the local bus in the same form as those memory requests made by microprocessor 12-20. Also, the XSM state machine 12-66 generates the required signals for transferring local memory data to system bus 16 via data swap circuits 12-56 and a set of registers of an array 12-58.

A processor state machine control block 12-80 controls the processing of transactions or requests initiated by microprocessor 12-20. As shown, commands generated by microprocessor 12-20 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively. This is all done in response to an enabling load signal PTDTLD generated by state machine 12-80.

The processing unit 12-2 further includes a plurality of system visible registers which are accessible via system bus 16 by microprocessor 12-20 or by any other system bus unit. A number of these registers connect in common to a receive bus (R Bus), as shown, for receiving input data from the RX DATA IN register 12-42.

These registers include a processor control command register (PCC) which comprises a plurality of flip-flop register stages, an EEPROM address register (EAR), a memory module register (MMR), a software message register (SMR), a pair of interrupt pending registers (IPR0 and IPR1) which serve as the output registers of an interrupt store (IPS) random access memory (RAM) 12-76 loadable from the R Bus by an interrupt register (ITR). As shown, the SMR, MMR, IPR0 and IPR1 registers also connect in common to a send bus (S Bus) for reading out of their contents to system bus 16 via a receive transfer second half bus cycle register (RTSHBC) 12-70.

Other system visible registers whose contents are only read, also connect in common to the S Bus. These registers include a syndrome register (SYN), a resource identification register (ID) and a revision number register (REV). The ID and REV registers which store constant values in addition to the MMR register are implemented in a programmable array logic (PAL) circuit while the other registers are implemented using standard register circuits.

The system visible registers are accessed in response to I/O commands applied to system bus 16 which results in the storing of address and command signals in registers 12-44 and 12-46. The address and command signals are decoded by the decode circuits of the RTR Control block 12-90. The system visible registers are described in greater detail in the Appendix.

As seen from FIG. 2, the processing unit 12-2 in accordance with the present invention includes three independently operated state machines 12-400, 12-420 and 12-440 which enable the simultaneous execution of different types of transactions. Each state machine connects to system bus 16 via receive command register 12-46 and is responsible for completing all aspects of a specific type of transaction (e.g. wait, retry conditions). Also PTR state machine 12-400 connects to the system bus circuits of block 12-91.

Also, each state machine connects to the system bus priority request circuits of block 12-460 which grants each state machine access to system bus 16 in response to request signals PTREQP, XTREQP, and RTREQP on a priority basis defined by the states of signals RXPTWON, RXXTWON, and RXRTWON, in addition to signal RXANYR.

Additionally, state machines 12-400, 12-420, and 12-440 receive input control signals from the processor state machine (PSM) state machine 12-80, external state machine (XSM) 12-66 and the RTR control circuits of block 12-90 respectively. These signals initiate the processing of the different types of transactions following the loading of the pertinent registers with command, address and data as appropriate.

Description of FIGS. 3a through 3d

Figure 3A:
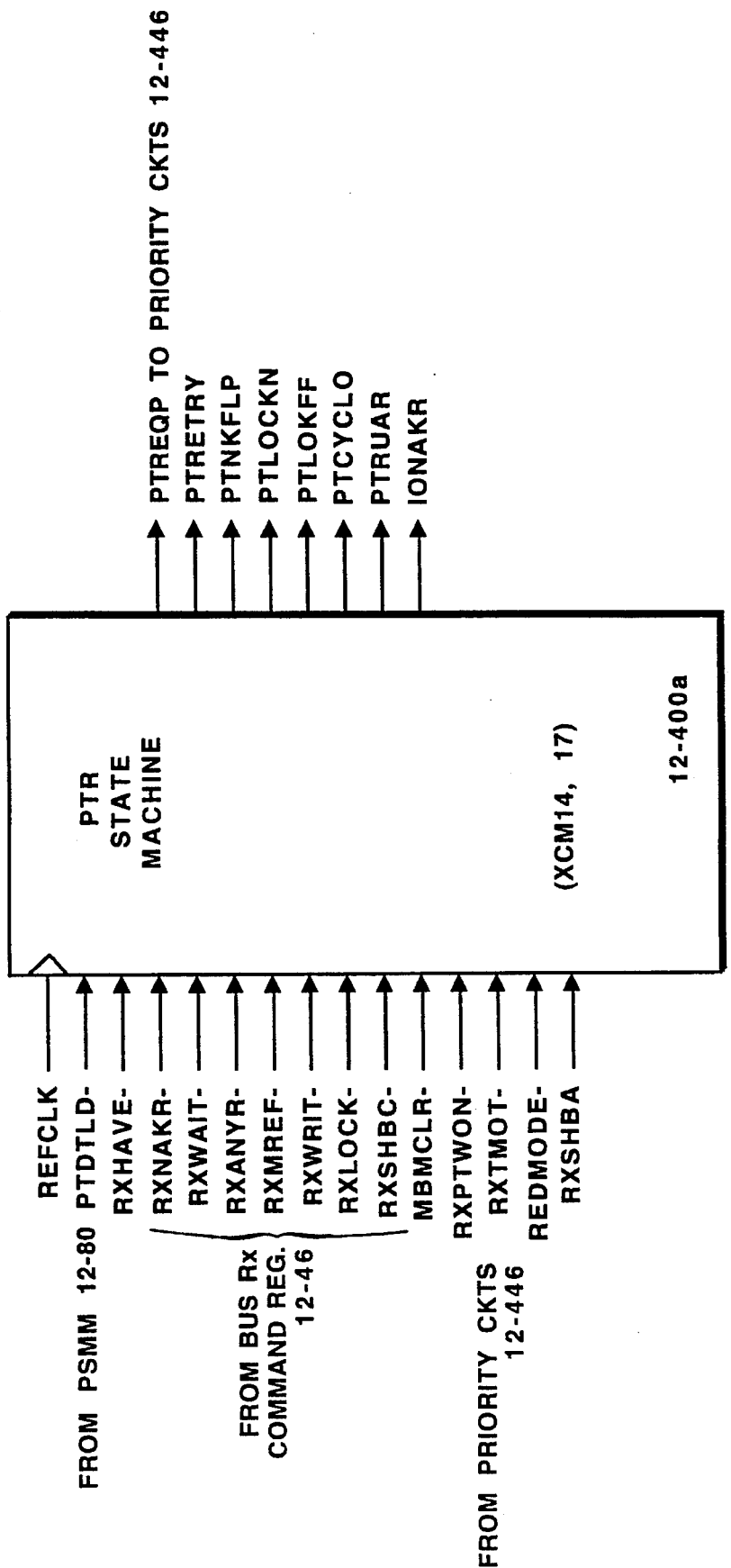
FIGS. 3a through 3d show in greater detail, the state machines and register control circuits of FIG. 2.

FIG. 3a shows in block form, the processor transfer state machine (PTR) 12-400 which controls the transfer of microprocessor generated commands to system bus 16. The PTR state machine 12-400 includes a pair of clocked programmable array logic (PAL) circuits 12-400a and 12-400b. As shown, PTR state machine circuit 12-400a receives as inputs, a clock signal REFCLK from clock generator circuits 12-22, a processor transfer load signal PTDTLD- from PSM state machine 12-80, a RXHAVE+ signal from RTR control circuits 12-90, system bus response signals RXNAKR, and RXWAIT in addition to a system bus time-out signal RXTMOT and system bus clear signal MBMCLR, system bus command/control signals RXWRIT, RXMREF, RXLOCK, RXSHBC, and RXMCLR from RXCMDIN register 12-46. Additionally, PTR state machine circuit 12-400a receives an any request signal RXANYR and system bus cycle won signal from register 12-46 generated by the system bus priority circuits of block 12-460. The PTR state machine circuit 12-400a generates as outputs, a request pending signal PTREQP applied to priority circuits of block 12-460, a retry signal PTRETRY, a lock NAK signal PTNKFLP, and lock output signals PTLOCKN and PTLOKFF. The equations for generating these output signals are set forth in the Appendix.

The PAL circuit 12-400b receives lock NAK response signal PTNKFLP from PAL circuit 12-400a, and second half bus cycle acknowledge signal RXSHBA from system bus 16. The PAL circuit 12-400b generates as outputs, a PT cycle over signal which is forwarded to PSM state machine 12-80, an I/O NAK signal IONAKR, and an unusual event signal PTRUAR which is forwarded to the syndrome register error circuits.

Figure 3B:
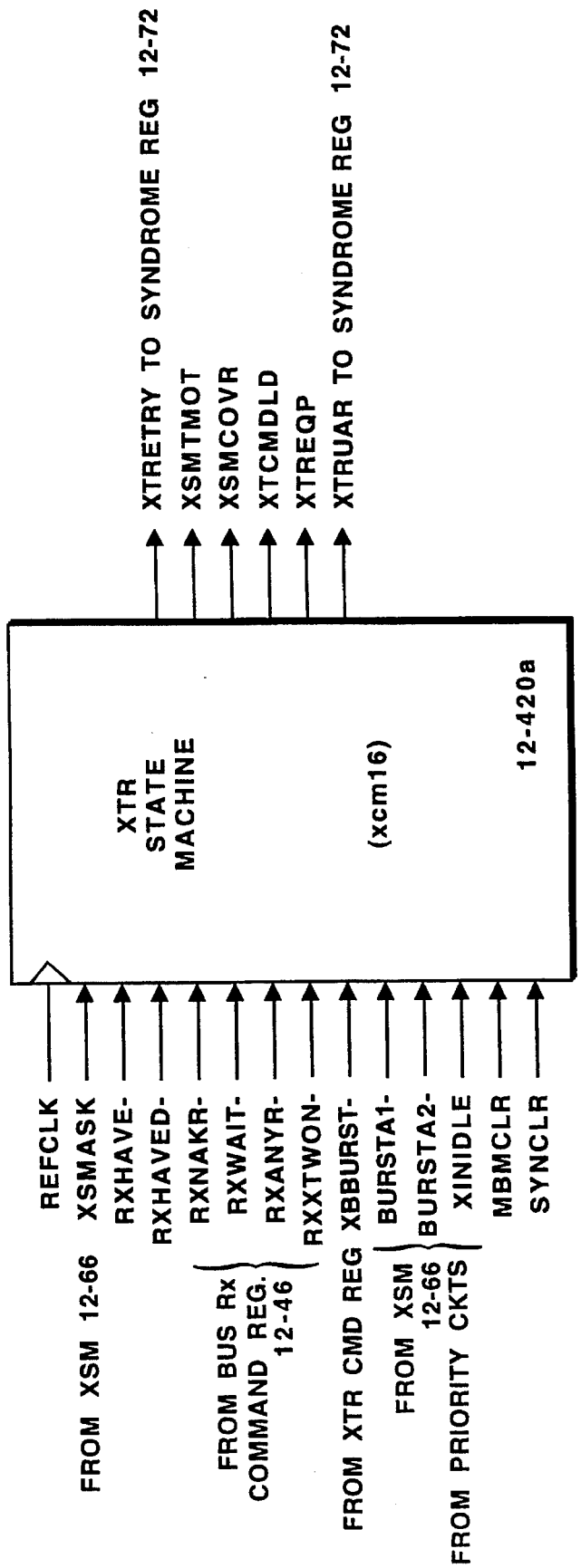

FIG. 3b shows in block form, the external state machine (XTR) 12-420 which controls the transfer and processing of external system bus requests to local memory 12-30. The XTR state machine 12-32 includes a clocked programmable array logic (PAL) circuit 12-420a which receives clock signal REFCLK from clock generator circuits 12-22. As shown, XTR state machine 12-420a also receives as inputs, an ask signal XSMASK, a syndrome register clear signal SYNCLR, burst address signals BURSTA1 and BURSTA2, and idle state signal XINIDLE from XSM state machine 12-66, signals RXHAVE+ and RXHAVED+ from the RTR control circuits 12-90, system bus response signals RXNAKR, and RXWAIT in addition to a system bus clear signal MBMCLR. Additionally, XTR state machine 12-420a receives an any request signal RXANYR and system bus cycle won signal RXXTWON from register 12-46 generated by the system bus priority circuits of block 12-460. The XTR state machine circuit 12-420a generates as outputs, retry signal XTRETRY, XSM time-out signal XSMTMOT, XSM cycle over signal XSMCOVR, and external command load signal XTCMDLD. Additionally, the XTR state machine circuit 12-420a generates a request pulse signal XTREQP which it applies to priority circuits of block 12-460 and an unusual event signal XTRUAR which it applies to the syndrome register error circuits. The equations for generating these output signals are set forth in the Appendix.

Figure 3C:
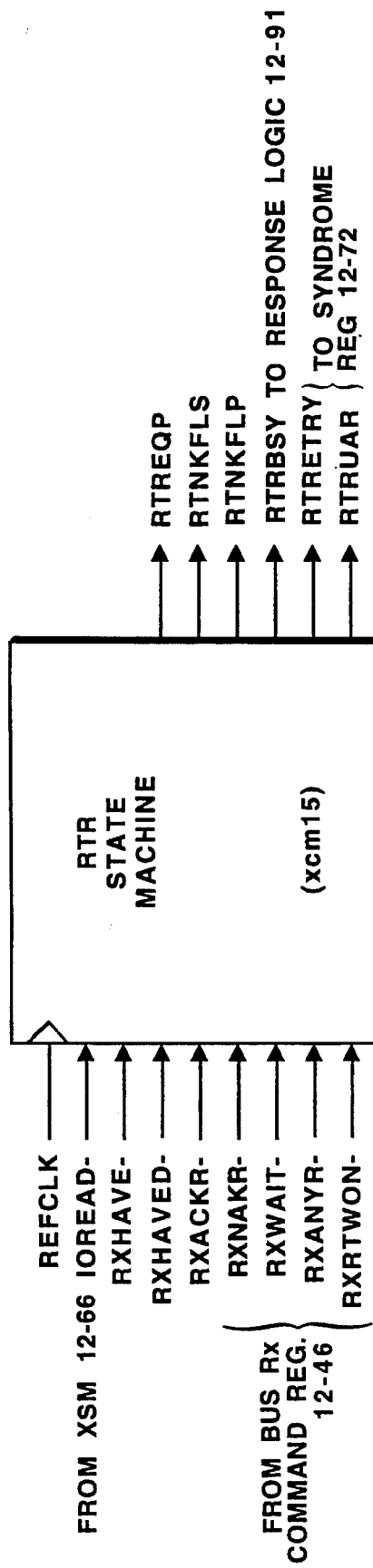

FIG. 3c shows in block form, the receive state machine (RTR) 12-440 which controls the processing of read/write register requests received from system bus 16. The RTR state machine includes a clocked programmable array logic (PAL) circuit 12-440a which receives clock signal REFCLK from clock generator circuits 12-22. As shown, RTR state machine circuit 12-440a also receives as inputs, signals RXHAVE+ and RXHAVED+ from the RTR control circuits 12-90, system bus response signals RXACKR, RXNAKR, and RXWAIT in addition to system bus clear signal MBMCLR and syndrome register clear signal SYNCLR. Additionally, circuit 12-440a receives an I/O read command signal from the decoder circuits of block 12-90. Additionally, RTR state machine circuit 12-440a receives any request signal RXANYR and system bus cycle won signal RXRTWON from register 12-46 generated by the system bus priority circuits of block 12-460.

The RTR state machine circuit 12-440a generates as outputs, retry signal RTRETRY, NAK signals RTNKFLS and RTNKFLP, and busy signal RTRBSY. Additionally, the RTR state machine 12-440a generates a request pulse signal RTREQP which it applies to the priority circuits of block 12-460 and an usual event signal RTRUAR which it applied to the syndrome register circuits. The equations for generating these output signals are set forth in the Appendix.

Figure 3D:
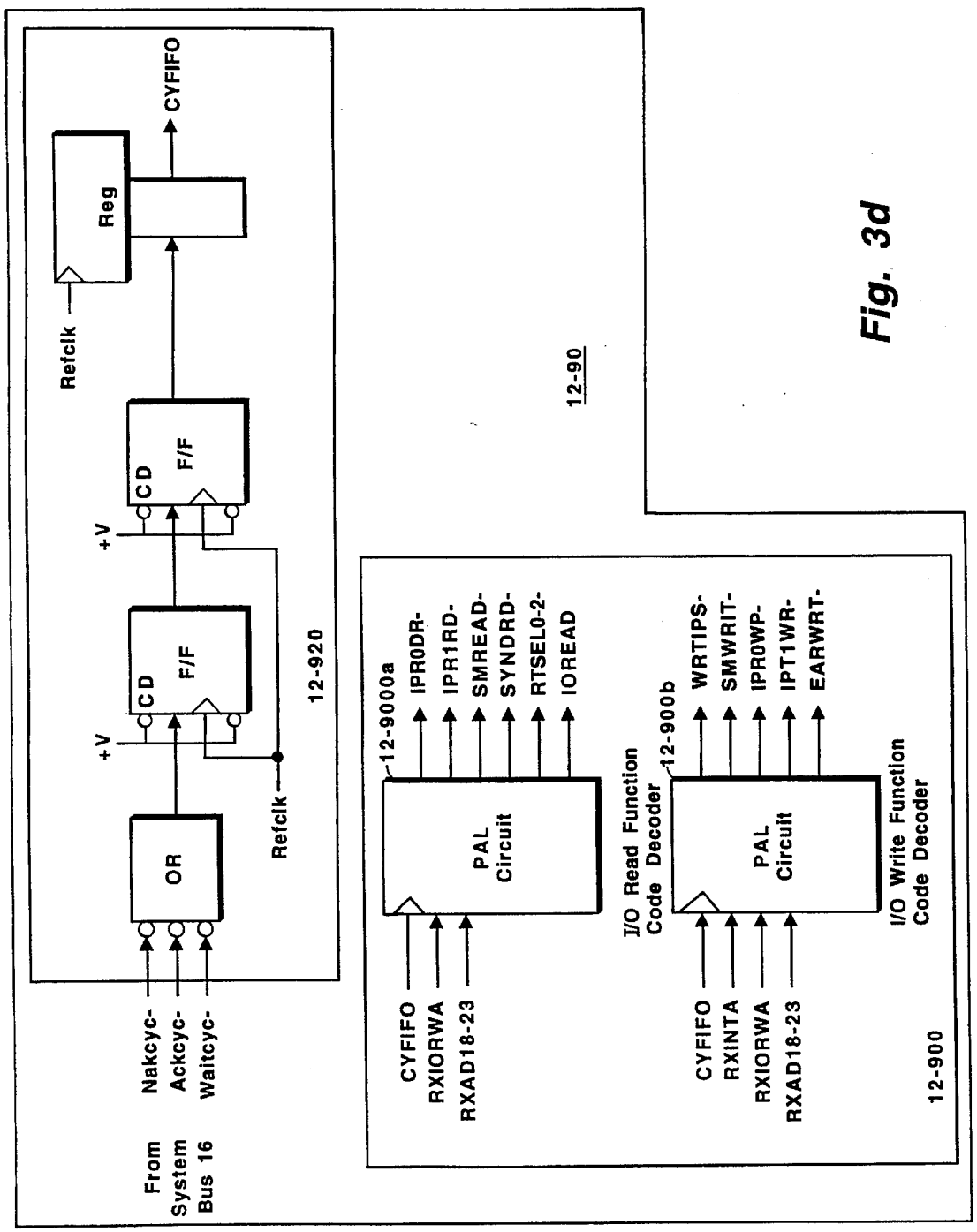

FIG. 3d shows in greater detail, the RTR control circuits of block 12-90. As shown, these circuits include the decoder circuits of block 12-900 and the timing circuits of block 12-920. The block 12-900 includes two PAL circuits 12-900a and 12-900b, each of which receive a clock input signal, CYFIFO from the timing circuits of block 12-920. Additionally, each circuit receives I/O read/write acknowledge signal RXIORWA+, in addition to input external command address signals RXAD18+ through RXAD23+ from RXADDRIN register 12-44. The PAL circuit 12-900b also receives an interrupt acknowledge signal RXINTA+.

The PAL circuit 12-900a generates as outputs, read enable interrupt register signals IPRORD and IPRIRD, software message read register enable signal SMREAD-, syndrome register enable signal SYNDRD-, register selection signals RTSEL0 through RTSEL2, IOREAD and I/O read signal IOREAD. The PAL circuit 12-900b generates as outputs, write IPS memory signal WRTIPS-, write software message register SMWRIT-, write interrupt register signals IPROWR- and IPR1WR- and EEPROM address register write signal EARWRIT. These signals are applied to the appropriate registers as read and write enable signals. The register select signals RTSELO+ through RTSEL2 are further decoded and used to generate the constant values from other PAL circuits, not shown, for the resource ID and revision number registers of block 12-72 of FIG. 2, in addition to reading out the contents of the memory module register from such other PAL circuits. The equations for generating these signals are set forth in the Appendix.

The timing circuits of block 12-920 include a pair of series connected D flip-flops 12-920b and 12-920c, each of which receives clock signal REFCLK. Flip-flop 12-920b receives as a data input, cycle request signal CYREQ+ which is generated by an OR gate 12-920a in response to a NAK, ACK, or WAIT cycle response received from system bus 16. Flip-flop 12-920b generates output signal RXHAVE+ which is in turn applied as a data input to flip-flop 12-920c as shown. This flip-flop generates a clock time later, signal RXHAVD which is applied to an output register 12-920d. This register, in response to a further clock signal, generates cycle FIFO signal CYFIFO. AS seen from FIG. 2, the signals RXHAVE+, RXHAVED+, CYCREQ and CYFIFO are distributed to the different ones of the control and register circuits of the mother board.

DESCRIPTION OF OPERATION

Figure 4B:
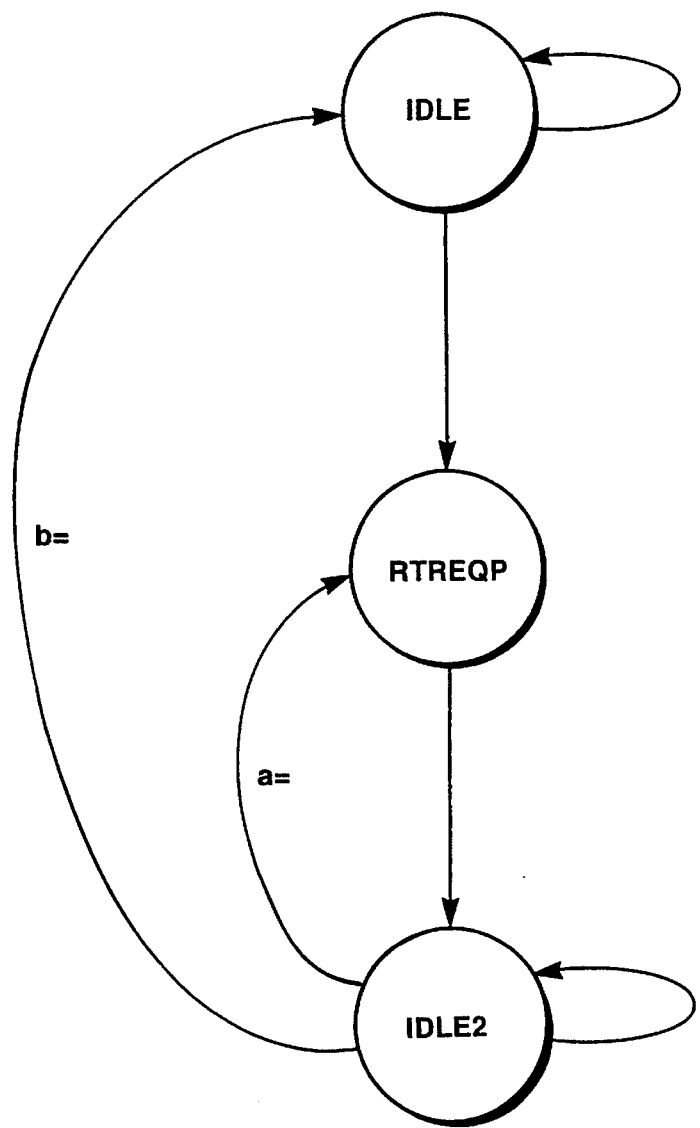

With reference to FIGS. 1 through 3d and the diagrams of FIGS. 4a through 5, the operation of the system interface circuits of the present invention will now be described. FIGS. 4a through 4c are flow diagrams which illustrate the independent operations of the PTR, XTR and RTR state machines in processing different types of transactions.

PTR State Machine Operation

Referring to FIG. 4a, it is seen that the PTR state machine 12-400 starts in the idle state and remains in that state until it receives a PT load signal PTDTLD from PSM state machine 12-80. At that time, the PTR state machine sequences to a PTR request state which results in the generation of signal PTREQP. This signal is sent to the system bus 16 via the priority request circuits 12-446. Next the PTR state machine 12-400 sequences to a second idle state (idle2) and waits for a response to come back from system bus 16.

There are several things that could take place as a result of the command issued by processing unit 12-2. If the command specified a memory lock operation, the PTR state machine 12-400 will sequence to path c if a negative acknowledgement was received as a response (bus NAK). This would occur if the area of memory being accessed was already being accessed by another unit on system bus 16. For further information about this type of operation, reference may be made to the copending related patent application entitled, "Method and Apparatus for Avoiding Processor Deadly Embrace in a Multiprocessor System."

In this situation, the PTR state machine 12-400 sequences to a PTLOCKN state via path c. It stays in that state until it receives an indication of a bus unlock operation having occurred on bus 16. This causes the PTR state machine 12-400 to return to the PT request state via path d. When in this state, the PTR state machine 12-400 initiates a lock retry procedure wherein the command is reissued to system bus 16 according to standard bus procedure. The other situation that can occur is that none of the conditions (i.e., a,b,c,d,e) occur, causing the PTR state machine 12-400 to remain in the idle2 state.

If the PTR state machine 12-400 received a WAIT response from system bus 16, it will again sequence to the PT request state. Also, if the PTR state machine 12-400 received a system bus time-out or an illegal response (i.e., it was doing a memory reference command and received a NAK response), it will return to the PT request state. Normally, the memory will never generate a NAK response to a memory request unless the request is for a lock operation. Accordingly, the PTR state machine 12-400 performs one more retry and if the condition occurs again, the PTR state machine 12-400 sequences to the cycle over state via path e. This state corresponds to an end state which is entered if an ACK response is received to a command, or a bus NAK response is received to an I/O command, or a second time-out or illegal response is received. At that time, the PTR state machine sets the NAK indicator (PTNKFLP).

It is seen that the retry sequence is programmable based upon whatever bus operation is being performed. In this way, the PTR state machine 12-400 is able to handle the lock NAK responses, bus WAIT responses, the retry conditions, not only in the case of bus errors or time-outs, but also in the case of illegal bus responses. In the case of processor issued commands, a wait response is a legal response. The same is true of a NAK response to an I/O command. However, the PTR state machine does not retry such I/O commands, but instead concludes the operation by sequencing to the cycle over state. In the case of retry, if a NAK response is received as a result of memory lock command, the PTR state machine waits for a memory unlock operation to occur on system bus 16 in which case the operation is retried.

RTR State Machine Operation

FIG. 4b illustrates the operation of the RTR state machine 12-420 of FIG. 3c. This state machine responds to I/O commands received from system bus 16 specifying either reading or writing the contents of a system visible register and, in the case of a read operation, returns the contents back to the requesting unit, such as a memory controller or another on-board memory processing unit.

As seen from FIG. 4b, the RTR state machine 12-420 starts in the idle state waiting for the receipt of an I/O read operation. Upon receipt of an I/O read command, it sequences to the RT request state. When in this state, the RTR state machine 12-400 generates signal RTREQP to the priority request circuits of block 12-460. It then sequences to the idle2 state.

As shown in FIG. 4b, the RTR state machine can terminate it operation in a number of ways. If it receives a bus WAIT response, it remains in the idle2 state until it receives data back during a second half bus cycle. Here, the only legal response in the case of a second half bus cycle is a bus ACK response. Therefore, if the RTR state machine receives a NAK or WAIT response, it returns back to the RT request state via path a and retries the operation. Also, in the case of a NAK or WAIT response, it sets the NAK indicator (i.e. RTNKFLP). If, as a result of the first retry operation, the RTR state machine receives another or second NAK response or receives an ACK response, it returns to the idle state. Here, in the case of the RTR state machine, a NAK or WAIT response is deemed illegal.

XTR State Machine Operation

Figure 4C:
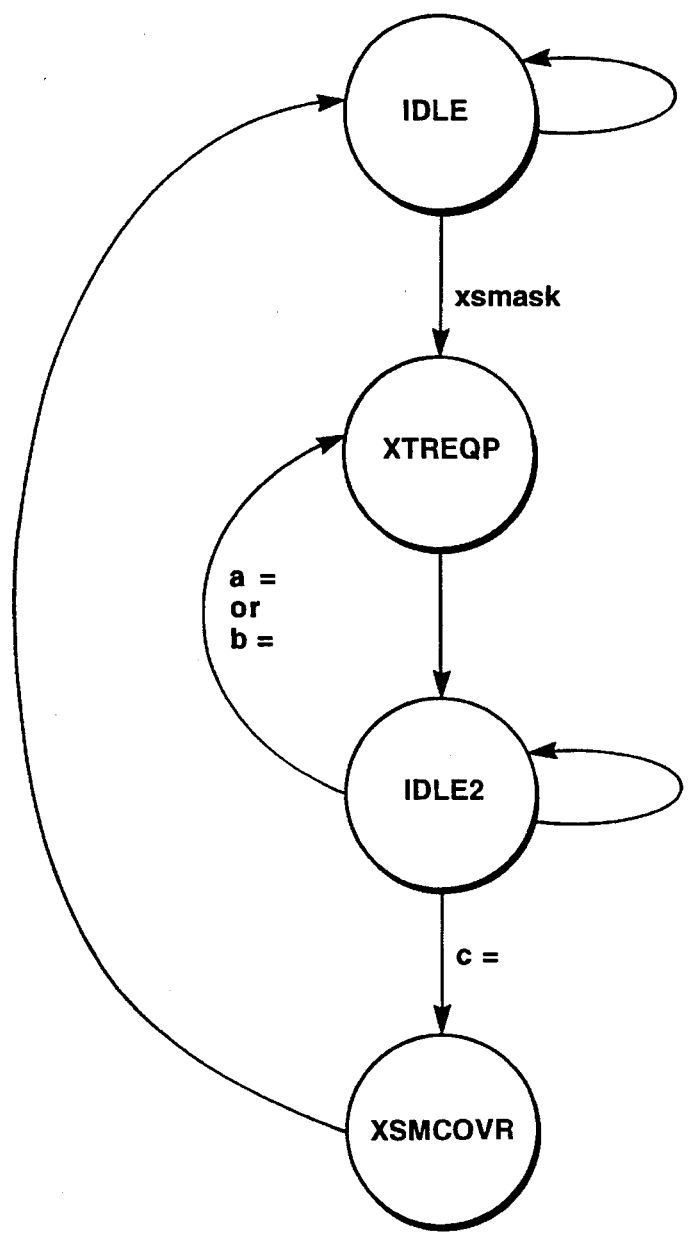

Referring to FIG. 4c, it is seen that the XTR state machine 12-440 starts in the idle state and remains in that state until it receives a request from the XSM state machine 12-66 (i.e., signal XSMASK) as for example to send data out of the burst array registers loaded from local memory 12-30 of block 12-58 to complete the execution of a read burst command received from system bus 16. At that time, the XTR state machine 12-440 sequences to the XT request state which results in the generation of signal XTREQP. This signal is sent to the system bus 16 via the priority request circuits 12-460. Next, the XTR state machine 12-440 sequences to the idle2 state. It will do a retry in the following situations. If it received a NAK or WAIT response, it will retry that operation once and if unsuccessful, it will terminate by entering a cycle over state via path c. This results in the generation of signal XSMCOVR. If it received a NAK response when doing the burst operation and the burst count was not equal to three, indicating the transfer of four words was not completed, then a retry is performed in order to send out the contents of the last burst register (fourth word) to system bus 16. Following that, the XTR state machine 12-440 again sequences to the cycle over state.

If the NAK indicator was set which means that the XTR state machine 12-440 did a retry operation but received a NAK or WAIT response or received a bus ACK response and was not doing a burst (single word) or doing a burst operation and the count was equal to three, this indicates that the operation was completed but an error was detected. This results in the setting of an unusual response indication (XTUAR) in the syndrome register error circuits which indicates that the XTR state machine received an illegal response after having already retried the operation. This enables the XSM state machine 12-66 to take whatever further action may be necessary, such as rereading local memory 12-30.

From the above, it is seen how the state machines are able to handle system bus responses differently. As mentioned, each of the state machines can be simultaneously processing a different transaction or request queued up in the different registers of the processing unit. For example, the microprocessor 12-20 could have made a request to the system bus 16. Simultaneously, the processing unit 12-2 could be processing a memory request received from system bus 16, in addition to processing an I/O command specifying the reading or writing of a system visible register. Once the transaction or request has been queued up, control is turned over to the appropriate state machine for completion. As described above, each state machine monitors the system bus 16 and is responsible for completing the transaction no matter what conditions happen to occur in the process of completion.

Figure 5:
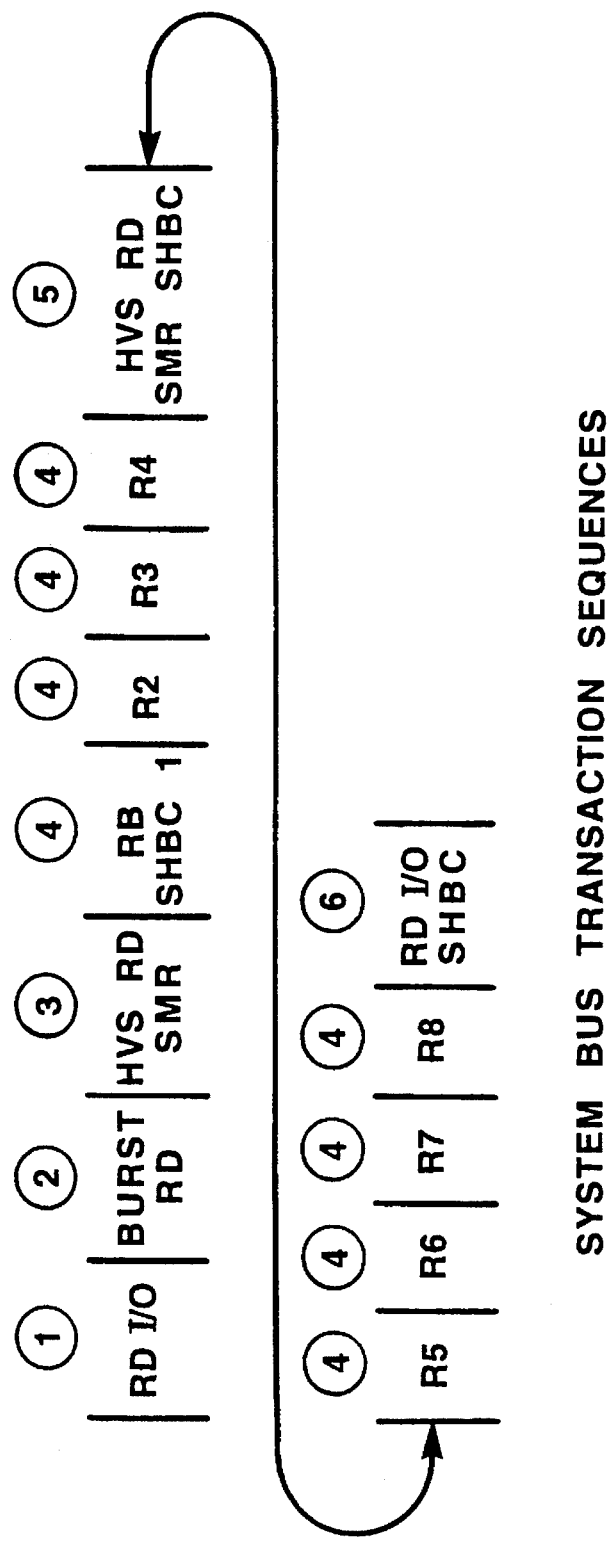
FIG. 5 is a diagram used to illustrate how the interface system of the present invention processes different types of transactions.

FIG. 5 illustrates how the state machines of the present invention is able to provide the simultaneous processing of transactions. Referring to the Figure, it is seen that the first transaction is an I/O command issued by the PSM state machine 12-80. In response to the Pt data load signal, the PTR state machine 12-400 operates to transfer the command to system bus 16 in the manner described above. While that operation is in process, the XSM state machine 12-66 issues request for transferring data in response to a burst read operation received from an I/O controller connected to system bus 16. In response to the burst request, the XSM state machine 12-66 initiates the read out of the requested four data words from local memory 12-30 and their loading into the burst array registers of block 12-58. Upon completion of the loading of the burst array registers, it generates signal XSMASK.

Upon receipt of signal XSMASK, the XTR state machine 12-420 will begin the transfer of data during subsequent second half bus cycles. As seen from FIG. 5, the first transfer occurs during a fourth cycle of operation.

While both operations are in process, a host processor of FIG. 1 issues an I/O request specifying the reading of the system message register. In response to the request, the RTR control circuits 12-90 generate the appropriate signals which cause the RTR state machine 12-440 to begin its processing of the request. The RTR state machine 12-440 delivers the contents of the software message register during the eighth cycle.

The data requested by the PSM state machine 12-80 on behalf of microprocessor 12-20 is delivered during the last cycle of FIG. 5. During the transaction sequence, burst data is being delivered to system bus 16 under the control of the XTR state machine 12-420 as shown in FIG. 5.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

APPENDIX

I. System Visible Registers

1. Processor Control Command (PCC) Register is a 16-bit register used for exercising overall control over processing unit 12-2. The PCC register is written in response to an I/O request containing a function code (address bits 18-23 on system bus 16) value of 01 (FC=01). The information directed to the PCC register arrives via an output control command with at least a binary ONE in a specific bit position of a 16-bit control word (system bus data bits BSDT00-BSDT15), indicating the particular control action requested to take place (e.g. reset or suspend microprocessor operation).

2. The Software Message Register (SMR) is a 16-bit register which is normally used by the operating systems to exchange messages therebetween. It is loaded from system bus 16. The SMR register is loaded from system bus 16 in response to an I/O command containing a function code (FC) value of 11 via data leads BSDT(00-15). The contents of the SMR register are placed on data leads BSDT(00-15) as part of a normal system bus response cycle, in response to an I/O command containing a function code (FC) value of 10.

3. The Revision-Number Register (RNR) is a read-only 16-bit constant register which contains the hardware revision number of the processor 12-2. The register contents are placed on the system bus data leads BSDT(00-15), in response to an I/O command containing a function code (FC) value of 22.

4. The Memory Module Register (MMR) stores a value interpreted as the starting address of the processor's on-board memory as seen from the system bus. The value is in terms of 16-Megabyte increments (i.e., the actual start address has 24 zero bits to the right of the number provided. The Memory Module Register is a read/write 8-bit register which contains an 8-bit module number. The Memory Module Register is loaded from system bus data leads BSDT(00-07) in response to an I/O command containing a function code (FC) value of 25. The contents of the Memory Module Register are placed on system bus data leads BSDT(00-07) and by placing zeroes on system bus data leads BSDT(08-15) in response to an I/O command containing a function code (FC) value of 24.

5. The Identification Register (IR) is a read-only 16-bit register which supplies a code constant to HVS operating system identifying it as a peer processor. The contents of the ID register are placed on data leads BSDT(00-15) as part of a normal system bus response cycle in response to an I/O command containing a function code (FC) value of 26.

6. The EEPROM Address Register (EAR) is loaded from system bus data leads BSDT(01-15) in response to an I/O command containing a function code (FC) value of 29. The EEPROM array contains two 64KB banks selected by QPE. The addressing range is 0000-7FFF sixteen-bit words (BSDT00 is ignored). The data from system bus data leads BSDT(00-15) is written into the 16-bit EEPROM "word-location" as addressed by the previous Load-EEPROM-Address-Register command in response to an I/O command containing a function code (FC) value of 2D. For each FC=2D command, 16 data bits are written into the EEPROM location specified by the EEPROM Address Register. The 16-bit EEPROM "word" as addressed by the previous Load-EEPROM-Address-Register command is placed on system bus data leads BSDT(00-15) in response to an I/O command containing a function code (FC) value of 28.

7. The Syndrome Register (SR) is a 16-bit read-only register which records the occurrence of unusual events encountered during operation of the processor 12-2. The Syndrome Register content is placed on data leads (BSDT(00-15) as part of a system bus response cycle in response to an I/O command containing a function code (FC) value of 3E.

8. Interrupt Pending Registers 0 and 1 are used for identifying an interrupt source. The registers are loaded in response to a load interrupt pending register command containing a function code value of 21 (IPR0) or 2B (IPR1) (FC=21 or FC=2B) which names a location to be read from the interrupt pending store (IPS) RAM specified by system bus data bits 12-15) and loaded into IPR0 or IPR1 registers. A second read interrupt pending register command containing a functional code value of 20 (IPR0) or 2A (IPR1) (FC=20 or FC=2A) when issued causes the IPR contents identifying the interrupting source to be returned via system bus 16. The two IPR registers permit both operating systems to concurrently access the IPS RAM.

PTR STATE MACHINE CIRCUIT 12-400a

Description of equation symbols:

(Where # = OR: ! = negation; and & = AND)

MODULE XCM14

Pin Specifications:

(Inputs)

| | | |
|---|---|---|
| REFCLK | PIN | 1; |
| !PTDTLD | PIN | 2; |
| RXHAVE | PIN | 3; |
| RXNAKR | PIN | 4; |
| RXWAIT | PIN | 5; |
| RXANYR | PIN | 6; |
| RXPTWON | PIN | 7; |
| RXTMOT | PIN | 8; |
| RXMREF | PIN | 9; |
| RXWRIT | PIN | 10; |
| RXLOCK | PIN | 11; |
| RXSHBC | PIN | 13; |
| MBMCLR | PIN | 14; |

(Outputs)

| | | |
|---|---|---|
| PTREQP | PIN | 23; |
| PTNKFLS | PIN | 21; |
| PTRETRY | PIN | 20; |
| PTNKFLP | PIN | 19; |
| PTLOCKN | PIN | 18; |
| PTLOKFF | PIN | 17; |

MODULE XCM14 - Continued

EQUATIONS

PTREQP  := PTDTLD & !MBMCLR #
          RXHAVE & RXPTWON & RXWAIT & !MBMCLR #
          RXHAVE & RXPTWON & PTNKFLS & !MBMCLR &
          (RXTMOT # !RXTMOT & RXNAKR & RXMREF &
          !RXLOCK # !RXTMOT & RXNAKR & RXMREF & RXLOCK
          & RXSHBC) #
          RXHAVE & PTLOCKN & !RXNAKR & !RXWAIT &
          !MBMCLR &
          RXMREF & RXLOCK & RXSHBC;

PTRETRY := RXHAVE & RXPTWON & (RXTMOT # RXNAKR &
          (RXMREF & !RXLOCK # RXMREF & RXLOCK &
          RXSHBC)) #
          PTRETRY & !SYNCLR;

PTNKFLS := !PTNKFLP & RXPTWON & RXHAVE & !MBMCLR &
          (RXTMOT # !RXTMOT & RXNAKR & (RXMREF &
          !RXLOCK # RXMREF & RXLOCK & RXSHBC));

PTNKFLP := PTNKFLS & RXHAVE & !MBMCLR #
          PTNKFLP & !(MBMCLR #
          RXHAVE & RXPTWON & (!RXNARK & !RXWAIT &
          RXANYR # !RXTMOT & RXNAKR & !RXMREF #
          !RXTMOT & RXNAKR & RXMREF & !RXLOCK #
          !RXTMOT & RXNAKR & RXMREF & RXLOCK & RXSHBC
          # RXTMOT));

MODULE XCM14 - Continued

EQUATIONS - Continued

PTLOCKN : = RXHAVE & RXPTWON & RXMREF & RXLOCK & !RXSHBC
& !RXTMOT & RXNAKR & !MBMCLR # PTLOCKN &
!(MBMCLR # RXHAVE & RXPTWON & !RXNAKR &
!RXWAIT & RXANYR # RXHAVE & RXPTWON &
PTNKFLP & RXTMOT);

PTLOKFF : = RXHAVE & RXPTWON & RXANYR & RXMREF & RXLOCK
& !RXSHBC & !RXNAKR & !RXWAIT & !MBMCLR #
PTLOKFF & !(MBMCLR # RXHAVE & RXPTWON &
RXANYR & RXMREF & RXLOCK & RXSHBC & !RXNAKR
& !RXWAIT);

PTR STATE MACHINE CIRCUIT 12-400b

MODULE XCM17

Pin Specifications:
(Inputs)

| | | |
|---|---|---|
| REFCLK | PIN | 1; |
| UEVCLR | PIN | 2; |
| RXHAVE | PIN | 3; |
| RXNAKR | PIN | 4; |
| RXWAIT | PIN | 5; |
| RXANYR | PIN | 6; |
| RXPTWON | PIN | 7; |
| RXTMOT | PIN | 8; |
| RXMREF | PIN | 9; |

MODULE XCM17 - Continued

Pin Specifications: - Continued
(Inputs) - Continued

| | |
|---|---|
| RXWRIT | PIN 10; |
| RXLOCK | PIN 11; |
| RXSHBC | PIN 13; |
| PTNKFLP | PIN 14; |
| MBMCLR | PIN 15; |
| RXSHBA | PIN 20; |

(Outputs)

| | |
|---|---|
| PTCYCLO | PIN 19; |
| PTRUAR | PIN 18; |
| IONAKR | PIN 17; |

EQUATIONS

UEVCLRS : = UEVCLR & RXHAVE # MBMCLR;

PTCYCLO : = RXHAVE & RXPTWON & RXANYR & RXWRIT & !RXNAKR & !RXWAIT # RXHAVE & RXPTWON & !RXTMOT & RXNAKR & !RXMREF # RXHAVE & RXPTWON & (PTNKFLP) & (RXTMOT # RXNAKR & RXMREF & !RXLOCK # RXNAKR & RXLOCK & RXSHBC) # RXHAVE & RXSHBA;

PTRUAR : = RXHAVE & RXPTWON & (PTNKFLP) & (RXTMOT # RXNAKR & RXMREF & !RXLOCK # RXNAKR & RXLOCK & RXSHBC) # PTRUAR & !UEVCLRS;

MODULE XCM17 - Continued

EQUATIONS - Continued

IONAKR := RXHAVE & RXNAKR & !RXTMOT & RXPTWON & !RXMREF & !RXSHBC # IONAKR & !(RXHAVE & !RXNAKR & !RXWAIT & RXANYR & RXPTWON & !RXMREF & !RXSHBC);

XTR STATE MACHINE CIRCUIT 12-420a

MODULE XCM16

Pin Specifications:
(Inputs)

| | | |
|---|---|---|
| REFCLK | PIN | 1; |
| XSMASK | PIN | 2; |
| RXHAVE | PIN | 3; |
| RXHAVED | PIN | 4; |
| RXNAKR | PIN | 5; |
| RXWAIT | PIN | 6; |
| RXANYR | PIN | 7; |
| RXXTWON | PIN | 8; |
| XBBURST | PIN | 9; |
| BURSTA1 | PIN | 10; |
| BURSTA2 | PIN | 11; |
| XINIDLE | PIN | 13; |
| SYNCLR | PIN | 20; |
| MBMCLR | PIN | 21; |

MODULE XCM16 - Continued

Pin Specifications: - Continued
(Outputs)

| | |
|---|---|
| XTRETRY | PIN 15; |
| XTNKFLP | PIN 17; |
| XSMTMOT | PIN 18; |
| XSMCOVR | PIN 19; |
| XTCMDLD | PIN 22; |
| XTREQP | PIN 23; |

EQUATIONS

XTRETRY : = RXHAVED & RXXTWON & (RXNAKR # RXWAIT) # XTRETRY & !SYNCLR;

XSMTMOT : = !RXHAVED & RXHAVE & RXXTWON & (XTNKFLP) & (RXWAIT # RXNAKR) # XSMTMOT & !XINIDLE;

XSMCOVR : = !RXHAVED & RXHAVE & RXXTWON & (XTNKFLP) & (RXWAIT # RXNAKR) # !RXHAVED & RXHAVE & RXXTWON & RXANYR & !RXWAIT & !RXNAKR & !XBBURST # !RXHAVED & RXHAVE & RXXTWON & RXANYR & !RXWAIT & !RXNAKR & XBBURST & BURSTA1 & BURSTA2 # XSMCOVR & !XINIDLE;

XTCMDLD : = XSMASK # RXHAVED & !RXHAVE & RXXTWON & RXANYR & !RXNAKR & !RXWAIT;

MODULE XCM16 - Continued

EQUATIONS - Continued

```
XTREQP  : = XSMASK  &  !MBMCLR  #  !RXHAVED  &  RXHAVE  &
            RXXTWON  &  RXANYR  &  !MBMCLR  &  (RXWAIT  #
            RXNAKR)  &  !XTNKFLP  #  !RXHAVED  &  RXHAVE  &
            RXXTWON  &  RXANYR  &  !MBMCLR  &  !RXNAKR  &
            !RXWAIT  &  XBBURST  &  !(BURSTA1  &  BURSTA2);
``` where

```
XTNKFLP : = RXHAVED  &  !RXHAVE  &  RXXTWON  &  !XTNKFLP  &
            !MBMCLR  &  (RXWAIT  #  RXNAKR)  #  XTNKFLP  &
            !XSMCOVR  &  !MBMCLR;

XTRUAR  : = !RXHAVED  &  RXHAVE  &  RXXTWON  &  (XTNKFLP)  &
            (RXWAIT  #  RXNAKR)  #  XTRUAR  &  !SYNCLR;
```

RTR STATE MACHINE 12-440a

MODULE XCM15

Pin Specifications:
   (Inputs)

| | | |
|---|---|---|
| REFCLK | PIN | 1; |
| RXHAVED | PIN | 2; |
| !IOREAD | PIN | 3; |
| RXACKR | PIN | 4; |
| RXNAKR | PIN | 5; |
| RXWAIT | PIN | 6; |
| RXANYR | PIN | 7; |
| RXRTWON | PIN | 8; |
| MBMCLR | PIN | 9; |
| SYNCLR | PIN | 10; |
| RXHAVE | PIN | 11; |

(Outputs)

| | | |
|---|---|---|
| RTREQP | PIN | 23; |
| RTNKFLS | PIN | 20; |
| RTNKFLP | PIN | 19; |
| RTRBSY | PIN | 18; |
| RTRETRY | PIN | 15; |
| RTRUAR | PIN | 14; |

EQUATIONS

```
!RTREQP : = RXHAVED  &  IOREAD  &  !MBMCLR  #  RTNKFLS  &
           (RXNAKR # RXWAIT) & RXRTWON & RXHAVED;
```

MODULE XCM15

EQUATIONS - Continued

RTNKFLS : = RXHAVED & !RTNKFLP & (RXNAKR # RXWAIT) & RXRTWON & !MBMCLR;

RTNKFLP : = RXHAVED & RTNKFLS & !MBMCLR # RTNKFLP & !MBMCLR & !(RXHAVED & RXRTWON & (RXACKR & RXANYR # RXWAIT & RTNKFLP # RXNAKR & RTNKFLP));

RTRETRY : = RXHAVED & RXRTWON & (RXNAKR # RXWAIT) # RTRETRY & !SYNCLR;

RTRUAR : = (RTNKFLP) & RXHAVED & RXRTWON & (RXNAKR # RXWAIT) # RTRUAR & !SYNCLR;

RTRBSY : = RXHAVED & IOREAD & RXACKR # RTRBSY & !(MBMCLR # RXHAVED & RXACKR & RXANYR & RXRTWON # (RTNKFLP) & RXHAVED & RXRTWON & (RXNAKR # RXWAIT));

RTR CONTROL DECODE CIRCUIT 12-900a

MODULE XCM25

This PAL is used for the IO write control.

Pin Specifications:

(Inputs)

| | |
|---|---|
| CYFIFO | PIN 1; |
| RXIORWA | PIN 3; |
| RXAD18 | PIN 4; |
| RXAD19 | PIN 5; |
| RXAD20 | PIN 6; |
| RXAD21 | PIN 7; |
| RXAD22 | PIN 8; |
| RXAD23 | PIN 9; |

(Outputs)

| | |
|---|---|
| !IPR0RD | PIN 23; |
| !IPR1RD | PIN 22; |
| !SMREAD | PIN 21; |
| !SYNDRD | PIN 20; |
| RTSEL0 | PIN 19; |
| RTSEL1 | PIN 18; |
| RTSEL2 | PIN 17; |
| !IOREAD | PIN 16; |
| UEVCLR | PIN 15; |

Equates:

FCODE = [RXAD18,RXAD19,RXAD20,RXAD21,RXAD22,RXAD23];

MODULE XCM25 - Continued

EQUATIONS

IPR0RD : = RXIORWA & (FCODE == ^H20);

IPR1RD : = RXIORWA & (FCODE == ^H2A);

SMREAD : = RXIORWA & (FCODE == ^H10);

SYNDRD : = RXIORWA & (FCODE == ^H3E);

```
RTSEL0 = RXIORWA & ((FCODE == ^H20) #
                    (FCODE == ^H2A) #
                    (FCODE == ^H10) #
                    (FCODE == ^H3E) #
                    (FCODE == ^H26) #
                    (FCODE == ^H24) #
                    (FCODE == ^H22));

RTSEL1 = RXIORWA & ((FCODE == ^H25) #
                    (FCODE == ^H24) #
                    (FCODE == ^H22));

RTSEL2 = RXIORWA & ((FCODE == ^H26) #
                    (FCODE == ^H22));
```

MODULE XCM25 - Continued

EQUATIONS - Continued

```
IOREAD = RXIORWA & ((FCODE == ^H10) #
                    (FCODE == ^H20) #
                    (FCODE == ^H22) #
                    (FCODE == ^H24) #
                    (FCODE == ^H26) #
                    (FCODE == ^H2A) #
                    (FCODE == ^H3A) #
                    (FCODE == ^H3E));

UEVCLR = RXIORWA & (FCODE == ^H3E);
```

RTR CONTROL DECODE CIRCUIT 12-900b

MODULE XCM24

This PAL is used as the IO write control PAL.

Pin Specifications:

(Inputs)

| | |
|---|---|
| CYFIFO | PIN 1; |
| RXINTA | PIN 2; |
| RXIORWA | PIN 3; |
| RXAD18 | PIN 4; |
| RXAD19 | PIN 5; |
| RXAD20 | PIN 6; |
| RXAD21 | PIN 7; |
| RXAD22 | PIN 8; |
| RXAD23 | PIN 9; |

MODULE XCM24 - Continued

Pin Specifications: - Continued (Outputs)

| | |
|---|---|
| !WRTIPS | PIN 23; |
| !SMWRIT | PIN 22; |
| !EARWRIT | PIN 21; |
| !IPR0WR | PIN 20; |
| !IPR1WR | PIN 19; |
| FCODE1 | PIN 18; |
| FC0OR31 | PIN 17; |
| FCODE33 | PIN 16; |

Equates:

FCODE = [RXAD18,RXAD19,RXAD20,RXAD21,RXAD22,RXAD23];

EQUATIONS

| | | |
|---|---|---|
| WRTIPS | = | CYFIFO & RXINTA; |
| SMWRIT | = | RXIORWA & (FCODE == ^H11); |
| EARWRIT | = | RXIORWA & (FCODE == ^H29); |
| IPR0WR | = | RXIORWA & (FCODE == ^H21); |
| IPR1WR | = | RXIORWA & (FCODE == ^H2B); |
| FCODE1 | = | RXIORWA & (FCODE == ^H01); |
| FC0OR31 | = | (FCODE == ^H00) # (FCODE == ^H31); |
| FCODE33 | = | (FCODE == ^H33); |

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A processing unit for processing a plurality of different types of system bus transactions, said processing unit being tightly coupled to a system bus which is operated according to a predetermined protocol, said processing unit including a microprocessor, a local memory tightly coupled to said microprocessor, a plurality of system visible registers and a system bus interface operatively coupled to said microprocessor, said local memory and said system visible registers for receiving and transmitting different types of requests including read/write commands, input/output commands and external read memory commands, said system bus interface comprising:

a first interface section coupled to said system bus and to said microprocessor for processing a first type of request corresponding to said read/write commands generated and transferred by said microprocessor to said system bus;

a second interface section coupled to said local memory for processing a second type of request corresponding to said external read memory commands transferred to said local memory from said system bus; and, a third interface section coupled to said system bus in common to said plurality of system visible registers for processing a third type of request corresponding to said external input/output commands received from said system bus reading and writing different ones of said registers, said interface sections each including a state machine programmed for independently processing each command until receipt of either a signal from said system bus indicating a successful completion of said each command or until completion of a predetermined retry procedure specific to the type of command being executed as defined by said predetermined protocol of said system bus thereby enabling simultaneous independent processing of said plurality of different types of bus transactions by said processing unit.

2. The processing unit of claim 1 wherein each of said state machines includes a number of programmable array logic (PAL) circuits, said number of PAL circuits being programmed to include a number of unique retry procedures for each command processed by corresponding interface section.

3. The processing unit of claim 2 wherein said number of PAL circuits of said first interface section operate to initiate a retry operation in response to receiving a wait signal from said system bus or a negative response if processing a predetermined type of memory command or terminate command processing upon receipt of a negative response to an input/output command.

4. The processing unit of claim 3 wherein said predetermined type of memory command corresponds to a memory lock command.

5. The processing unit of claim 2 wherein said number of PAL circuits of said third interface section operate to signal completion said command in response to an acknowledgement signal and to initiate a retry operation in response to either a negative response or a wait response which is treated as illegal according to said predetermined protocol.

6. The processing unit of claim 2 wherein said number of PAL circuits of said second interface section operate to initiate a retry operation in response to a negative response or wait response when processing a predetermined type of command requiring several system bus cycles of operation which was not completed and to set an indicator upon receiving an illegal response from said system bus.

7. The processing unit of claim 2 wherein one of said number of PAL circuits of each interface section is programmed to sequence through a number of preestablished states for completing the execution of each of said commands received by said interface section.

8. The processing unit of claim 7 wherein said one PAL circuit of each of said interface sections starts operating in a first one of said preestablished states corresponding to an idle state and in response to each command received by said interface, sequences to a second one of said preestablished states corresponding to a request state.

9. The processing unit of claim 8 wherein said one PAL circuit of each of said interface sections sequences from said second preestablished state to a third preestablished state corresponding to a second idle state upon issuing said command to said system bus.

10. The processing unit of claim 9 wherein said one PAL circuit of said first and second interface sections sequences from said third preestablished state to a fourth preestablished state corresponding to a cycle over state for signaling the termination of processing said command.

11. The processing unit of claim 1 wherein said unit further includes a clock generator for generating a clock reference signal for synchronizing the operations of each of said interface sections enabling the simultaneous processing of commands by said interface section.

12. The processing unit of claim 1 wherein said third interface section includes a send bus and a receive bus respectively for connecting said plurality of system visible registers to said system bus for reading out information to said system bus and writing information into each of said registers from said system bus.

13. A processing unit which tightly couples to a system bus which is operated according to a predetermined protocol, said processing unit including a microprocessor, a local memory tightly coupled to said microprocessor, a plurality of system visible registers and a system bus interface operatively coupled to said microprocessor, said local memory and to said plurality of system visible registers for receiving and transmitting to said system bus, different types of requests including processor read/write commands, external memory read commands and external input/output commands, said system bus interface comprising:

a first interface section coupled to said microprocessor for processing said read/write commands generated by said microprocessor and transferred to said system bus which require execution of a first type of processing sequence for completion;

a second interface section coupled to said local memory for processing said external read memory commands received from said system bus and transferred to said local memory which require execution of a second type of processing sequence for completion;

a third interface section coupled to in common to said plurality of system visible registers for processing said external input/output commands received from said system bus for reading different ones of said registers which require execution of a third type of processing sequence for completion; and, each of said first, said second and said third interface sections including a state machine programmed for independently processing each command according to said first, second and third type of processing sequence, respectively, until receipt of a signal from said system bus indicating either a successful completion of said each command or until completion of a predetermined retry procedure specific to a type of command being executed as defined by said predetermined protocol of said system bus for enabling simultaneously independent processing of said different types of requests by said processing unit.

* * * * *